United States Patent
Elkhouly et al.

(10) Patent No.: US 10,491,027 B2
(45) Date of Patent: Nov. 26, 2019

(54) WIRELESS POWER TRANSMISSION

(71) Applicant: Intel Corporation, Santa Clara, CA (US)

(72) Inventors: Essam Elkhouly, Santa Clara, CA (US); Songnan Yang, San Jose, CA (US); Zhen Yao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 15/088,319

(22) Filed: Apr. 1, 2016

(65) Prior Publication Data

US 2017/0288446 A1     Oct. 5, 2017

(51) Int. Cl.
*H02J 7/02*       (2016.01)
*H02J 50/12*     (2016.01)
*H02J 50/60*     (2016.01)
*H02J 50/40*     (2016.01)

(52) U.S. Cl.
CPC .............. *H02J 7/025* (2013.01); *H02J 50/12* (2016.02); *H02J 50/40* (2016.02); *H02J 50/60* (2016.02)

(58) Field of Classification Search
CPC .............. H02J 7/025; H02J 50/12; H02J 50/60
USPC .......................................... 307/104; 320/108
See application file for complete search history.

(56) References Cited

U.S. PATENT DOCUMENTS

| | | | |
|---|---|---|---|
| 2005/0288743 A1* | 12/2005 | Ahn .......................... | A61N 1/08 607/61 |
| 2009/0134712 A1* | 5/2009 | Cook ....................... | H02J 50/12 307/104 |
| 2009/0152954 A1* | 6/2009 | Le ........................... | H02J 17/00 307/110 |
| 2009/0243397 A1* | 10/2009 | Cook ....................... | H02J 5/005 307/104 |

(Continued)

FOREIGN PATENT DOCUMENTS

| | | |
|---|---|---|
| JP | 2010141977 A | 6/2010 |
| JP | 2012182980 A | 9/2012 |
| WO | 2013035884 A1 | 3/2013 |

OTHER PUBLICATIONS

PCT International Search Report, International Application No. PCT/US2017/015991, date of completion Apr. 25, 2017, 3 pages.
U.S. Appl. No. 14/978,272, filed Dec. 22, 2015, Elkhouly, Essam.

*Primary Examiner* — Rexford N Barnie
*Assistant Examiner* — Thai H Tran
(74) *Attorney, Agent, or Firm* — International IP Law Group, P.L.L.C.

(57) ABSTRACT

Techniques for modifying the electrical current distribution of transmit coil of a wireless power transmitting unit are described. An example power transmitting unit includes a transmit coil configured to generate a magnetic field to wirelessly power a device within an active wireless charging area. The power transmitting unit can also include a power source to transmit an alternating electrical current to an input terminal of the transmit coil and a plurality of reactive elements placed in series with the transmit coil. In some (Continued)

examples, the plurality of reactive elements attach to the transmit coil at least a quarter of a turn from the input terminal. The power transmitting unit can also include a controller to modify a reactance value of the reactive elements to adjust a current distribution of the transmit coil in response to detecting a characteristic of a power receiving unit.

21 Claims, 6 Drawing Sheets

(56) References Cited

U.S. PATENT DOCUMENTS

| | | | |
|---|---|---|---|
| 2011/0049995 A1* | 3/2011 | Hashiguchi | H02J 5/005 |
| | | | 307/104 |
| 2011/0163713 A1 | 7/2011 | Wang et al. | |
| 2011/0276208 A1* | 11/2011 | Sasaki | B60K 6/365 |
| | | | 701/22 |
| 2012/0267960 A1 | 10/2012 | Low et al. | |
| 2014/0085951 A1* | 3/2014 | Kaeriyama | H04B 3/50 |
| | | | 363/126 |
| 2014/0375137 A1* | 12/2014 | Ichikawa | H04B 5/0037 |
| | | | 307/104 |
| 2015/0244178 A1* | 8/2015 | Tang | A61N 1/3787 |
| | | | 307/104 |
| 2016/0380480 A1 | 12/2016 | Yang et al. | |

* cited by examiner

WIRELESS POWER TRANSMISSION

TECHNICAL FIELD

This disclosure relates generally to techniques for wireless power transfer. Specifically, this disclosure relates to techniques for modifying the current distribution of a transmit coil in a wireless power transmitter.

BACKGROUND

A basic wireless power transfer system may include a wireless power transmitter unit (PTU) and a wireless power receiving unit (PRU). A PRU may be implemented in a mobile computing device, such as a laptop, tablet or smart phone, which can be placed on a charging mat equipped with a PTU. The PTU may include a transmit (Tx) coil and a PRU may include a receive (Rx) coil. In typical wireless power transfer systems, the transmit coil creates an alternating electromagnetic field and the receive coil takes power from the electromagnetic field and converts the power back into electrical current to charge the battery and/or power the device.

Two common techniques for wireless power transfer are referred to as inductive charging and magnetic resonance charging. In inductive charging, the transmit and receive coils are tightly coupled and operate like two windings of a transformer. In magnetic resonance charging, the transmit and receive coils are loosely coupled and both coils are tuned to the same resonant frequency to improve efficiency.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for modifying or adjusting the current distribution of a transmit coil of a wireless power transmitter unit (PTU) or any other suitable wireless charging device. In some embodiments, the wireless charging device can include a transmit coil, a power source, a plurality of reactive elements, and a controller. A reactive element, as referred to herein, can include a fixed capacitor, a tunable capacitor, an inductor, such as a tunable inductor, and the like. The transmit coil can be configured to generate a magnetic field to wirelessly power a device within an active wireless charging area. For example, the transmit coil can wirelessly provide power to one or more power receiving units (PRUs). The power source can transmit an alternating electrical current to an input terminal of the transmit coil and the plurality of reactive elements can be placed in series with the transmit coil. In some embodiments, the reactive elements are attached to the transmit coil at least a quarter of a turn of a coil from the input terminal. In some examples, the power source and the plurality of reactive elements can be electrically coupled to opposite ends of the transmit coil. For example, the power source can be connected to a center of the transmit coil while the plurality of reactive elements are connected to an edge of the transmit coil. In another example, the power source can be connected to an edge of the transmit coil while the plurality of reactive elements are connected to the center of the transmit coil.

In some embodiments, the controller can modify the reactance value of the reactive elements to adjust a current distribution of the transmit coil in response to detecting a characteristic corresponding to a power receiving unit or a change in the transmit coil of the power transmitting unit. The reactance value, as referred to herein, indicates an opposition of the reactive element to change a current or voltage of the PRU. For example, the controller can detect a characteristic of a power receiving unit with a metal backing and modify the reactance value of the reactive elements. In some examples, the controller can modify switches corresponding to the reactive elements to be opened or closed. The controller can therefore modify the current distribution in the transmit coil. The modification to the current distribution of the transmit coil can increase the amount of energy transferred to a power receiving unit and decrease the amount of time to charge the power receiving unit.

The techniques described herein may be implemented in part using a wireless charging standard protocol, such as a specification provided by Alliance For Wireless Power (A4WP), Wireless Power Consortium (WPC), and others. However, the techniques described herein may also be implemented using any other wireless charging standard protocol where applicable.

Figure 1:
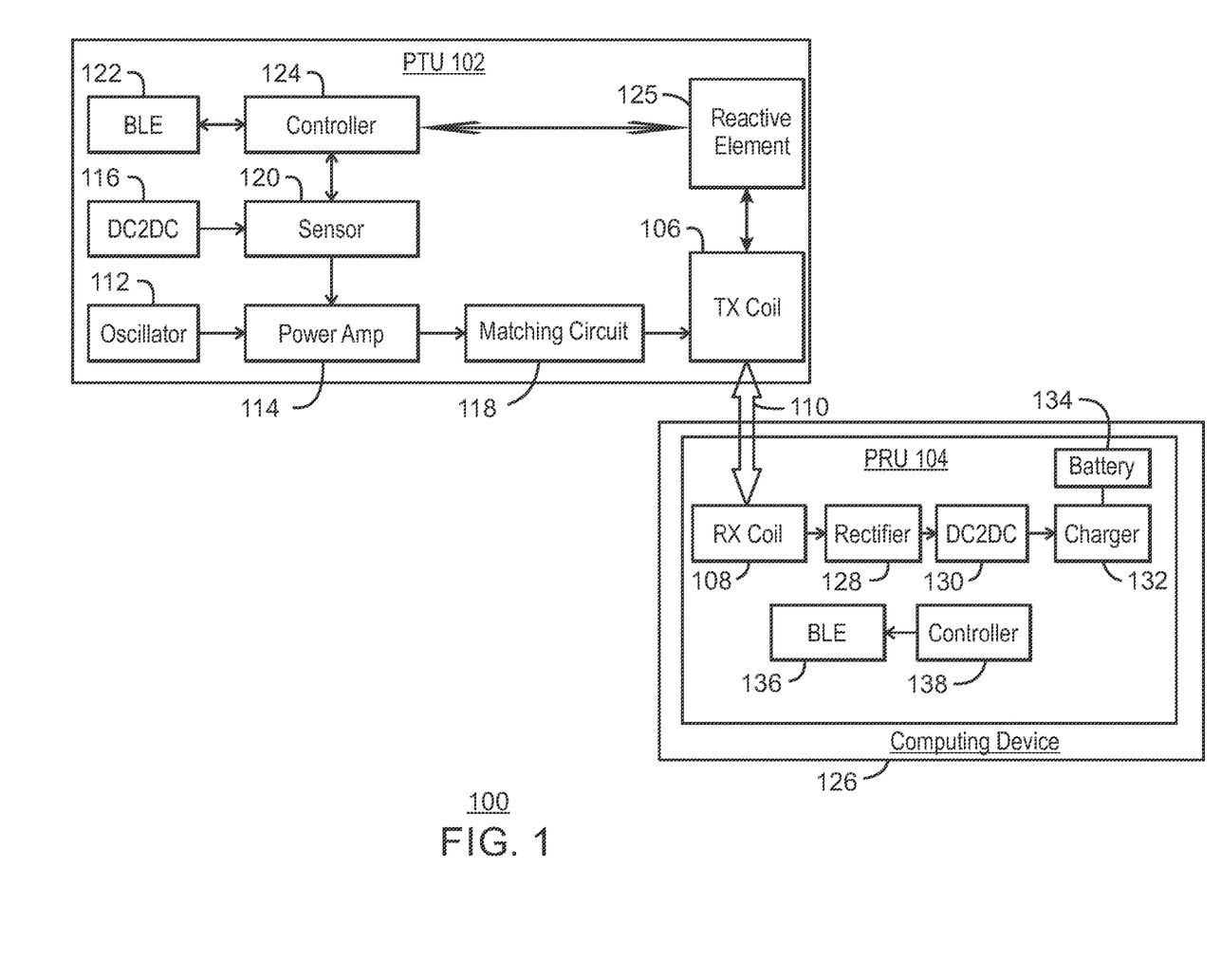
FIG. 1 is block diagram of a PTU to provide power to a PRU.

FIG. 1 is block diagram of a PTU to provide power to a PRU. The PTU 102 is configured to wirelessly transmit power from the transmit coil 106 of the PTU 102 to the receive coil 108 of the PRU 104 as indicated by the arrow 110. The transmit coil includes one or more coils connected to a plurality of capacitors and a power generation source, which are described further below in relation to FIGS. 2A-2C. The PTU 102 may be a magnetic resonance-type wireless power transmitter, in which case the transmit coil 106 is tuned to the same resonant frequency as the receive coil 108. Also, in magnetic resonance-type wireless power transmission, the transmit coil array transmits power at a single resonant frequency.

The PTU 102 may include an oscillator 112, a power amplifier 114, a Direct Current to Direct Current (DC2DC) converter 116, and a matching circuit 118. The oscillator 112 is configured to generate a periodic oscillating electronic signal at a specified frequency. The power amplifier 114 receives direct current power from the DC2DC converter 116, and amplifies the signal received from the oscillator 112. The matching circuit 118 matches the impedance of the power amplifier 114 to the impedance of the transmit coil array 106 to ensure efficient power transmission. The matching circuit 118 may include any suitable arrangement of electrical components such as capacitors, inductors, and other circuit elements that can be adjusted to impedance match the transmit coil array 106 to the power amplifier 114.

Other components of the PTU 102 may include a current sensor 120, a Bluetooth Low Energy (BLE) module 122, a controller 124, and others. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 124 of the PTU 102. A load change may be detected and used as an indication that an object has been placed in the vicinity of the transmit coil, such as a device to be charged or a foreign object.

The controller 124 can be configured to control various aspects of the operation of the PTU 102. For example, the controller 124 can set a frequency, and/or power level of the power radiated by the transmit coil 106. The controller 124 can also control communications between the PTU 102 and the PRU 104 through the BLE module 122. In some embodiments, the controller 124 can compensate for a mutual coupling change between the PTU 102 and the PRU 104. For example, the controller 124 can modify a reactance value of reactive elements 125 located in or around the transmit coil. In some examples, the controller 124 can adjust a current distribution of the transmit coil 106 by modifying the reactance value of the reactive elements 125. Modifying the reactance value of the reactive elements is shown in greater detail below in relation to FIGS. 2-5.

The PRU 104 may be a component of a computing device 126 configured to receive power from the PTU 102 wirelessly by the inductive coupling 110. The computing device 126 may be any suitable type of computing device, including a laptop computer, an Ultrabook, a tablet computer, a phablet, a mobile phone, smart phone, smart watch, and other types of mobile battery-powered devices.

The PRU 104 can include a rectifier 128, a DC2DC converter 130, a battery charger 132, and a battery 134. The computing device 126 receives electrical power as a magnetic flux associated with the inductive coupling that passes through the receive coil 108. The rectifier 128 receives an alternating current (AC) voltage from the receive coil 108 and generates a rectified DC voltage (Vrect). The DC2DC converter 130 receives the rectified voltage from the rectifier 128, converts the voltage to a suitable voltage level, and provides the output to the battery charger 132. The battery 134 powers the various platform hardware of the computing device 126. The platform hardware includes the processors, working memory, data storage devices, communication buses, I/O interfaces, communication devices, display devices, and other components that make up the computing device 126.

The PRU 104 may also include a Bluetooth Low Energy (BLE) module 136 and a controller 138. The controller 138 is configured to perform a wireless handshake with the PTU 102. As discussed above, the wireless handshake broadcast may be performed through the BLE modules 122 and 136 or other wireless data transmission component. Various types of information may be transmitted during the wireless handshake, including power budget, wireless charging capabilities, size of the computing device 126, and other information.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2A:
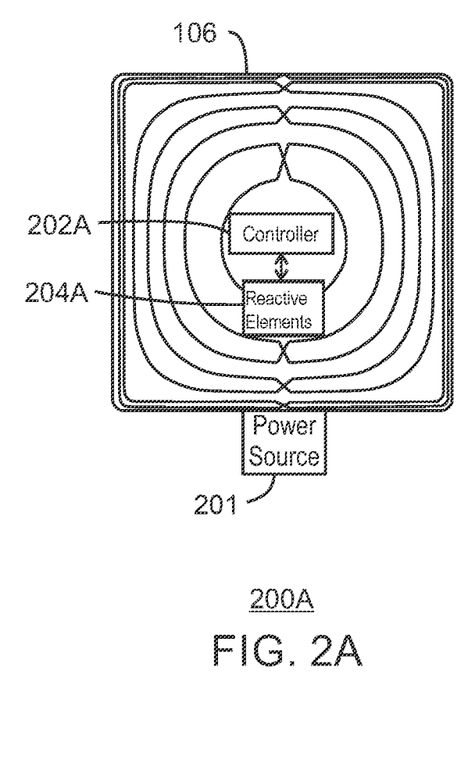
FIGS. 2A, 2B, and 2C are examples of transmit coils.

FIG. 2A is one example of a transmit coil. The transmit coil 106 can include one or more conductive turns configured to receive an alternating electrical current from a power source 201 and a reactance value from a controller 202A. The controller 202A may include the components described in relation to FIG. 1, such as the oscillator 112, the power amplifier 114, the DC2DC converter 116, the matching circuit 118, controller 124, and others. Current flowing on the conductive turns generates the magnetic field used for wireless charging. The transmit coil shown in FIG. 2A includes several turns spaced at specific distances. The number of turns, the shape of the turns, and the spacing between the turns may be selected to focus the electromagnetic field within the active charging area. However, the specific arrangement shown in FIG. 2A is not a limitation of the present techniques. The current techniques can be implemented using any suitable type of transmit coil with any number, shape, or spacing of turns.

In relation to the transmit coil 106, there is a defined area above the transmit coil referred to herein as the active charging area. The active charging area is where PRUs 104 can be placed so that the PTU 102 will be activated and begin generating an oscillating magnetic field to charge the PRU 104. Typically, the magnetic field is maintained at a relatively uniform and strong level within the active charging area. Outside the charging area, the magnetic field weakens with distance. In some examples, the active charging area will be approximately equal to the area bounded by transmit coil or the outer turn if there is more than one.

In some embodiments, the controller 202A can modify a reactance value of the reactive elements 204A. The reactance value can indicate a number of switches corresponding to the reactive elements that are to be opened or closed. In some examples, the reactive elements 204A can be attached at the center of the transmit coil 106. A power source 201 can be attached to an input terminal at an outer edge of the transmit coil 106 to provide an alternating electrical current to the transmit coil 106. In some embodiments, as a result of the reactive element's change, the resulting current distribution of the transmit coil 106 can be adjusted proximate the center of the transmit coil 106. Thus, the transmit coil 106 of FIG. 2A can have a lower magnitude of reactance value proximate the power source 201 and compensate for mutual coupling change to the PRU.

Figure 2B:
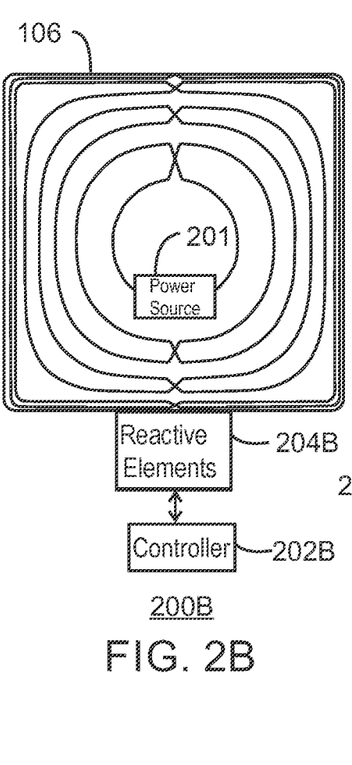

FIG. 2B is one example of a transmit coil. The transmit coil 106 can include one or more conductive turns configured to receive an alternating electrical current from a power source 201 and a reactance value from a controller 202B. The controller 202B may include the components described in relation to FIG. 1, such as the oscillator 112, the power amplifier 114, the DC2DC converter 116, the matching circuit 118, controller 124, and others. Current flowing on the conductive turns generates the magnetic field used for wireless charging. The transmit coil shown in FIG. 2B includes several turns spaced at specific distances. The number of turns, the shape of the turns, and the spacing between the turns may be selected to focus the electromagnetic field within the active charging area. However, the specific arrangement shown in FIG. 2B is not a limitation of the present techniques. The current techniques can be implemented using any suitable type of transmit coil with any number, shape, or spacing of turns.

In relation to the transmit coil 106, there is a defined area above the transmit coil referred to herein as the active charging area. The active charging area is where PRUs 104 can be placed so that the PTU 102 will be activated and begin generating an oscillating magnetic field to charge the PRU 104. Typically, the magnetic field is maintained at a relatively uniform and strong level within the active charging area. Outside the charging area, the magnetic field weakens with distance. In some examples, the active charging area will be approximately equal to the area bounded by transmit coil or the outer turn if there is more than one.

In some embodiments, the controller 202B can modify a reactance value of a plurality of reactive elements 204B. In some examples, the reactive elements 204AB can be attached at the outer edge of the transmit coil 106. A power source 201 can be attached to an input terminal at the center of the transmit coil 106 to provide an alternating electrical current to the transmit coil 106. In some embodiments, as a result of the reactive element's change, the resulting current distribution of the transmit coil 106 can be adjusted proximate the outer edge of the transmit coil 106. Thus, the transmit coil 106 of FIG. 2B can have a lower magnitude of reactance level proximate the power source 201 and compensate for the mutual coupling change to the PRU.

Figure 2C:
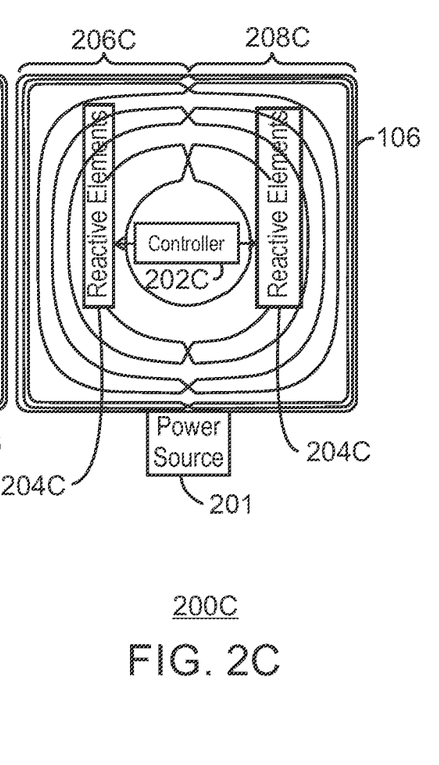

FIG. 2C is one example of a transmit coil. The transmit coil 106 can include one or more conductive turns configured to receive an alternating electrical current from a power source 201. The transmit coil 106 can be connected to a controller 202A via reactive elements 204C. The controller 202A may include the components described in relation to FIG. 1, such as the oscillator 112, the power amplifier 114, the DC2DC converter 116, the matching circuit 118, controller 124, and others. Current flowing on the conductive turns generates the magnetic field used for wireless charging. The transmit coil shown in FIG. 2C includes several turns spaced at specific distances. The number of turns, the shape of the turns, and the spacing between the turns may be selected to focus the electromagnetic field within the active charging area. However, the specific arrangement shown in FIG. 2C is not a limitation of the present techniques. The current techniques can be implemented using any suitable type of transmit coil with any number, shape, or spacing of turns.

In relation to the transmit coil 106, there is a defined area above the transmit coil referred to herein as the active charging area. The active charging area is where PRUs 104 can be placed so that the PTU 102 will be activated and begin generating an oscillating magnetic field to charge the PRU 104. Typically, the magnetic field is maintained at a relatively uniform and strong level within the active charging area. Outside the charging area, the magnetic field weakens with distance. In some examples, the active charging area will be approximately equal to the area bounded by transmit coil or the outer turn if there is more than one.

In some embodiments, the controller 202C can modify a reactance value from a plurality of reactive elements 204C, which are placed at multiple symmetric locations along the transmit coil 106. The symmetric locations, as referred to herein, are points at which electrical current distributions of the transmit coil can be adjusted while maintaining a matching current distribution on either side of the transmit coil. For example, if the transmit coil 106 is divided into two portions 206C and 208C, the current distribution should be the same in portion 206C of the transmit coil and portion 208C of the transmit coil. In some examples, the reactive elements 204C can be attached along any suitable number of symmetric locations of the transmit coil 106. In some embodiments, a power source 201 can be attached to an outer edge of the transmit coil 106 to provide an alternating electrical current to the transmit coil 106. As a result of the reactive element's change, the resulting electrical current distribution of the transmit coil 106 can be adjusted proximate the symmetric locations of the transmit coil to which reactive elements are connected. Thus, the transmit coil 106A of FIG. 2C can reduce the magnitude of a reactance value of the transmit coil 106 along portions of the transmit coil 106 proximate the power source 201.

Figure 3A:
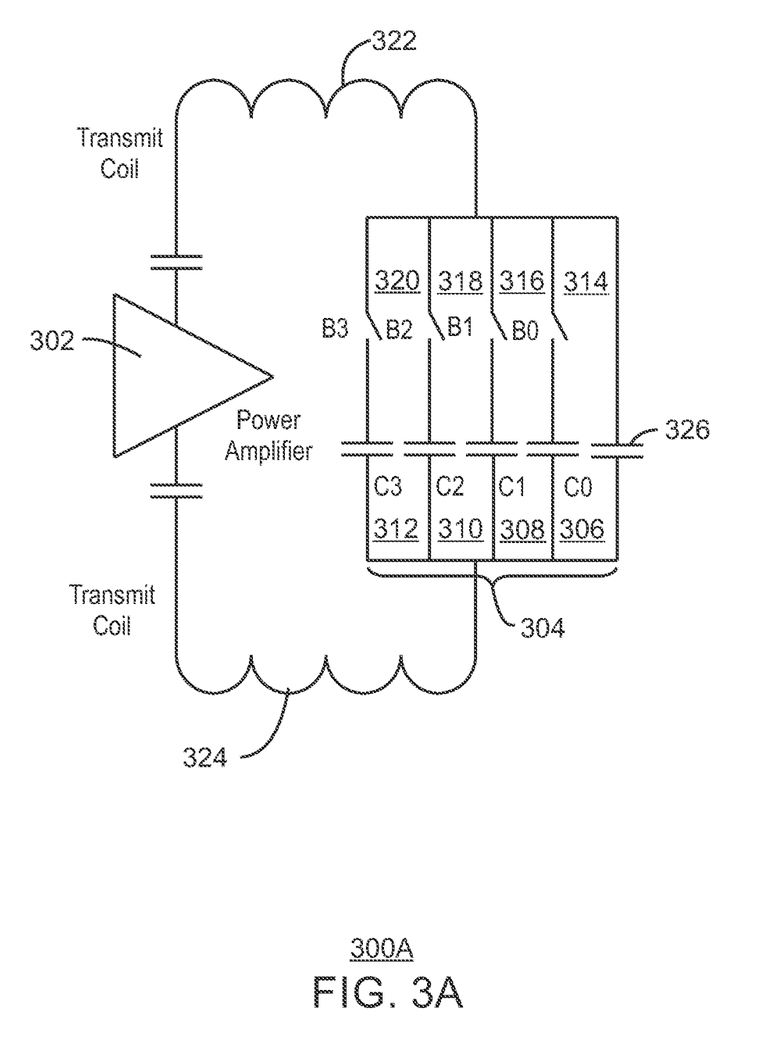
FIGS. 3A and 3B are examples of transmit coils connected to reactive elements at various locations along the transmit coils.
Figure 3B:
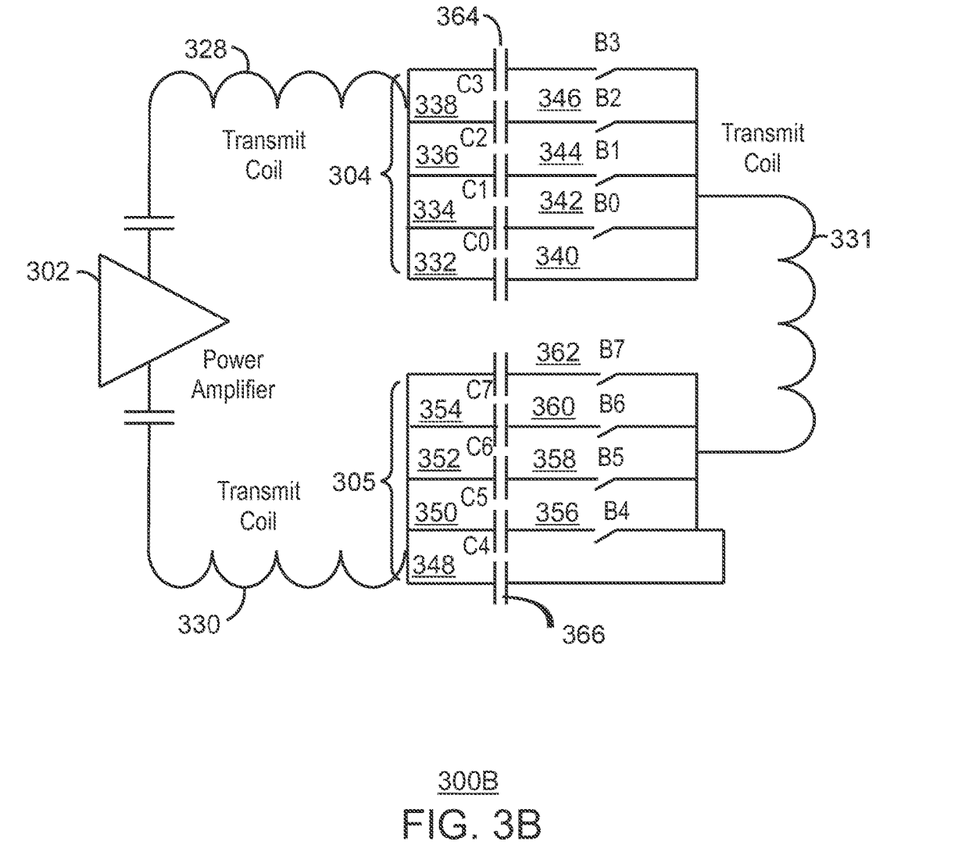

FIGS. 3A and 3B are examples of transmit coils connected to reactive elements at various locations along the transmit coils. In FIG. 3A, a power amplifier 302 provides an alternating electrical current to a set of reactive elements. The reactive elements can be fixed capacitors, tunable capacitors, tunable inductors, or inductors, among others. In the example of FIGS. 3A and 3B, capacitors 304 are illustrated. The set of capacitors 304 in FIG. 3A includes four capacitors: C0 306, C1 308, C2 310, and C3 312 with switches B0 314, B1 316, B2 318, and B3 320. The power amplifier 302 transmits the alternating electrical current to the set of capacitors 304 via a first portion 322 of a transmit coil and a second portion 324 of the transmit coil. A control line 326 provides a signal to the set of capacitors 304 indicating a reactance value. For example, the reactance value can indicate a number of switches corresponding to the capacitors to be opened or closed. In some embodiments, the set of capacitors 304 can adjust a current distribution of the transmit coil 106 by modifying the number of switches that are open or closed. Additionally, the set of capacitors 304 can reduce a reactance value of the transmit coil proximate the power amplifier 302 and compensate for mutual coupling change to the PRU.

In FIG. 3B, a power amplifier 302 provides an alternating electrical current to two sets of capacitors 304 and 305. The power amplifier 302 transmits the alternating electrical current to the sets of capacitors 304 and 305 via a first portion 328 of the transmit coil, a second portion 330 of the transmit coil, and a third portion 331 of the transmit coil. The sets of capacitors 304 and 305 in FIG. 3C each include four capacitors. For example, the set of capacitors 304 can include capacitors C0 332, C1 334, C2 336, and C3 338 with switches B0 340, B1 342, B2 344, and B3 346. In this example, the remaining set of capacitors 305 can include capacitors C4 348, C5 350, C6 352, and C7 354 with switches B4 356, B5 358, B6 360, and B7 362. Control lines 364 and 366 provide a signal indicating a reactance value to the sets of capacitors 304 and 305. The control lines 364 and 366 can indicate the number of capacitors 332-338, and 348-354 that are to modify the current distribution of the first portion 328 of the transmit coil, the second portion 330 of the transmit coil, and a third portion 331 of the transmit coil. In some embodiments, the capacitors 304 and 305 can reduce the magnitude of a reactance value proximate the power amplifier 302 by modifying the number of switches that are to be opened or closed.

Figure 4:
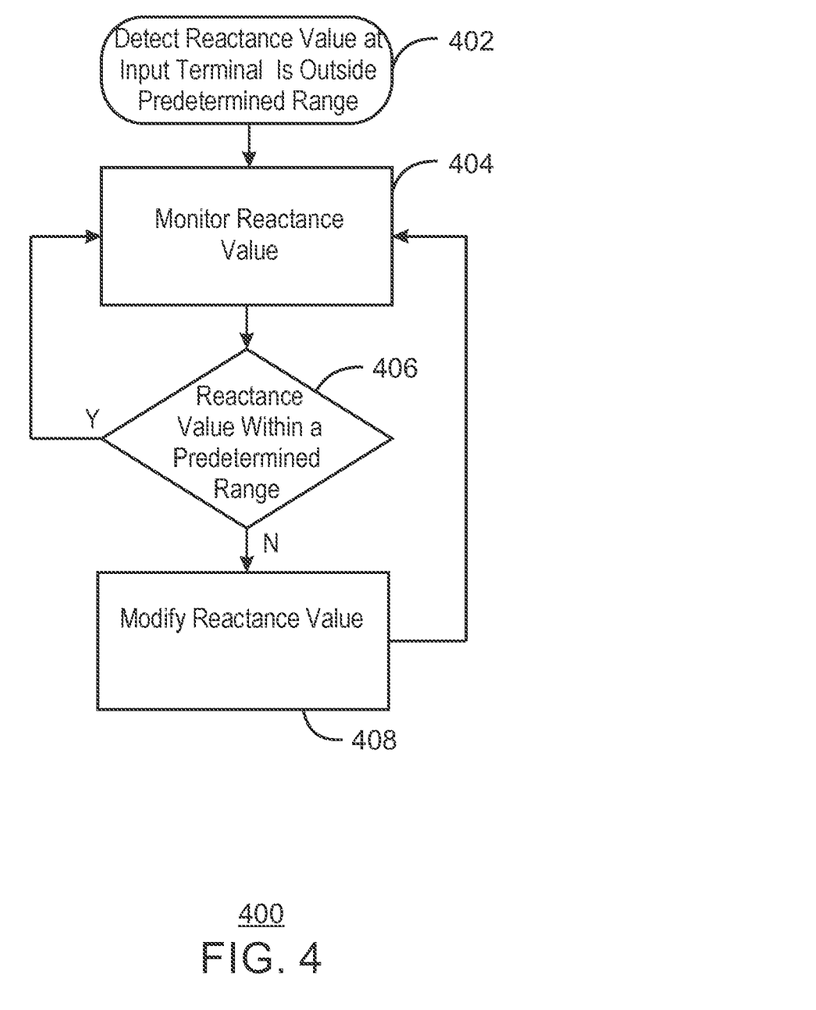
FIG. 4 is a process flow diagram of a method for modifying a current distribution of a transmit coil.

FIG. 4 is a process flow diagram of an example method for wirelessly charging a receiving device. The method 400 can be implemented with any suitable electronic charging device, such as the PTU 102 of FIG. 1.

At block 402, the PTU 102 can detect a reactance value at an input terminal of a transmit coil is outside of a predetermined range, which can indicate to start adjusting a reactive element. The input terminal can indicate a point at which a power source that provides an alternating current attaches to the transmit coil. Adjusting a reactive element can include modifying the current distribution of a transmit coil and modifying a reactance value at the input terminal of the transmit coil. For example, the adjusting a reactance element can indicate modifying a number of switches corresponding to capacitors that are opened or closed.

At block 404, the PTU 102 can monitor a reactance value. The reactance value, as referred to herein, indicates an opposition of the PTU 102 to change a current or voltage of a PRU. The PTU 102 can detect the reactance value using any suitable technique, such as measuring a magnitude of a current, measuring a magnitude of a voltage, measuring a phase difference between the magnitude of the current and the voltage at an input terminal of the transmit coil, and the like.

At block 406, the PTU 102 determines if the reactance value is within a predetermined range. For example, the PTU 102 can determine if the reactance value is within a particular range of zero. If the reactance value is within a predetermined range, the process flow returns to block 404. If the reactance value is not within a predetermined range, the process flow continues at block 408.

At block 408, the PTU 102 can modify a reactance value. The reactance value, as referred to herein, can indicate a number of switches corresponding to reactive elements that are to modify the electrical current distribution of a transmit coil in the PTU 102. The electrical current distribution, as discussed above, can reduce the magnitude of the reactance value proximate the input terminal of the transmit coil. The modification to the electrical current distribution in the transmit coil can compensate for mutual coupling change between the PTU 102 and a receiving power unit. The process flow continues by returning to block 404 to continue monitoring the reactance value.

The method 400 should not be interpreted as meaning that the blocks are necessarily performed in the order shown. Furthermore, fewer or greater actions can be included in the method 400 depending on the design considerations of a particular implementation.

Figure 5:
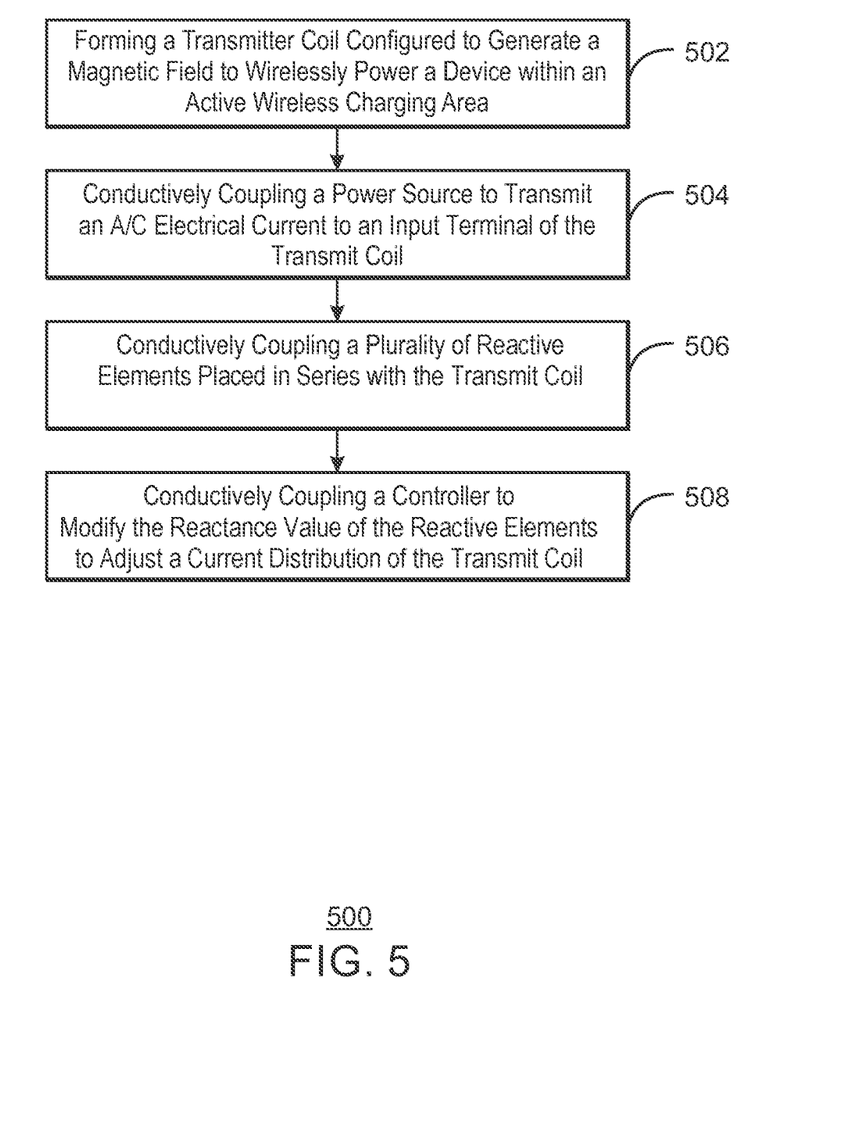
FIG. 5 is a process flow diagram of a method for manufacturing a transmit coil.

FIG. 5 is a process flow diagram of a method of manufacturing a transmit coil. The method may begin at block 502.

At block 502, a transmit coil is formed. The transmit coil is configured to generate a magnetic field to wirelessly power a device within an active wireless charging area. The transmit coil includes at least one turn, and can also include several turns. The dimensions of the turns may be selected to focus the magnetic energy within the active charging area.

At block 504, a power source is conductively coupled to the transmit coil. The power source is configured to deliver an alternating electrical current to an input terminal of the transmit coil to generate the magnetic field at a desired frequency.

At block 506, a plurality of reactive elements are conductively coupled to the transmit coil. The plurality of reactive elements can be placed in series with the transmit coil, wherein the plurality of reactive elements are attached to the transmit coil at least a quarter of a turn from the input terminal. For example, the reactive elements can be attached to the transmit coil at a point that is at least a ninety degree turn from the input terminal attached to the transmit coil. In some embodiments, the plurality of reactive elements and the power source connect to the transmit coil at opposing ends of the transmit coil. The plurality of reactive elements can modify the electrical current distribution of the transmit coil proximate the area of the input terminal. For example, the point at which the transmit coil attaches to the reactive elements can have a slightly different current distribution than the point at which the transmit coil attaches to the power source.

At block 508, a controller is conductively coupled to the transmit coil to modify a reactance value of the reactive elements to adjust a current distribution of the transmit coil. In some embodiments, the controller modifies the reactance value in response to detecting a characteristic of a power receiving unit or a change in the transmit coil of the power transmitting unit. In some embodiments, the characteristic of the power receiving unit can include a size of a power receiving unit, or a coupling distance between the power transmitting unit and the power receiving unit, among others. The controller can determine, based on the characteristic, a number of switches corresponding to the reactive elements that are to be opened or closed to adjust the electrical current distribution of the transmit coil. For example, the controller can determine that any suitable number of capacitors are to adjust the electrical current distribution of the transmit coil in order to compensate for a mutual coupling change between the transmit coil and a receive coil of a PRU. By modifying the electrical current distribution, the controller can dynamically alter the current distribution of the transmit coil to reduce the reactance value at points along the transmit coil proximate the reactive elements and the input terminal.

The method 500 should not be interpreted as meaning that the blocks are necessarily performed in the order shown. Furthermore, fewer or greater actions can be included in the method 500 depending on the design considerations of a particular implementation. For example, in some embodiments, the controller can determine if a PRU comprises a metal backing. For example, the controller can detect if the PRU comprises a metal surface proximate the receive coil. In response to detecting the metal backing in the PRU, the controller may modify the electrical current distribution of the transmit coil of the power transmitting unit as described above. If the controller does not detect a metal backing in the PRU, the controller may not modify the electrical current distribution of the transmit coil of the power transmitting unit.

Example 1

In one embodiment, a power transmitting unit includes a transmit coil configured to generate a magnetic field to wirelessly power a device within an active wireless charging area. The power transmitting unit can also include a power source to transmit an alternating electrical current (A/C) to an input terminal of the transmit coil and a plurality of reactive elements placed in series with the transmit coil, wherein the plurality of reactive elements are attached to the transmit coil at least a quarter of a turn from the input terminal. Furthermore, the power transmitting unit can include a controller to modify a reactance value of the reactive elements to adjust a current distribution of the transmit coil in response to detecting a characteristic of a power receiving unit or a change in the transmit coil of the power transmitting unit.

Alternatively, or in addition, the input terminal can attach to the center of the transmit coil. Alternatively, or in addition, the input terminal of the transmit coil can be located at an outer edge of the transmit coil. Alternatively, or in addition, the reactive elements of the transmit coil can be located in the center of the transmit coil. Alternatively, or in addition, the reactive elements can be attached to the transmit coil at an edge of the transmit coil. Alternatively, or in addition, the reactive elements can include fixed capacitors, inductors, tunable inductors, or tunable capacitors. Alternatively, or in addition, the reactive elements can be connected to the transmit coil at a plurality of symmetric locations. Alternatively, or in addition, adjusting the current distribution of the transmit coil can cause the transmit coil to have the magnitude of a reactance value below a threshold proximate the input terminal. Alternatively, or in addition, the characteristic of the power receiving unit can include a metal backing. Alternatively, or in addition, the characteristic of the power receiving unit can include a size of the power receiving unit, or a coupling distance between the power transmitting unit and the power receiving unit.

Example 2

In one embodiment, a method of manufacturing a power transmitting unit includes forming a transmit coil configured to generate a magnetic field to wirelessly power a device within an active wireless charging area. Manufacturing the power transmitting unit can also include conductively coupling a power source to transmit an alternating electrical current to an input terminal of the transmit coil and conductively coupling a plurality of reactive elements placed in series with the transmit coil, wherein the plurality of reactive elements are attached to the transmit coil at least a quarter of a turn from the input terminal. Furthermore, manufacturing the power transmitting unit can include conductively coupling a controller to the transmit coil to modify a reactance value of the reactive elements to adjust a current distribution of the transmit coil in response to detecting a characteristic of a power receiving unit or a change in the transmit coil of the power transmitting unit.

Alternatively, or in addition, the input terminal can attach to the center of the transmit coil. Alternatively, or in addition, the input terminal of the transmit coil can be located at an outer edge of the transmit coil. Alternatively, or in addition, the reactive elements of the transmit coil can be located in the center of the transmit coil. Alternatively, or in addition, the reactive elements can be attached to the transmit coil at an edge of the transmit coil. Alternatively, or in addition, the reactive elements can include fixed capacitors, inductors, tunable inductors, or tunable capacitors. Alternatively, or in addition, the reactive elements can be connected to the transmit coil at a plurality of symmetric locations. Alternatively, or in addition, adjusting the current distribution of the transmit coil can cause the transmit coil to have the magnitude of a reactance value below a threshold proximate the input terminal. Alternatively, or in addition, the characteristic of the power receiving unit can include a metal backing. Alternatively, or in addition, the characteristic of the power receiving unit can include a size of the power receiving unit, or a coupling distance between the power transmitting unit and the power receiving unit.

Example 3

In yet another embodiment, a wireless charger can include a transmit coil configured to generate a magnetic field to wirelessly power a device within an active wireless charging area and a power source to transmit an alternating electrical current to an input terminal of the transmit coil. The wireless charger can also include a plurality of reactive elements placed in series with the transmit coil, wherein the plurality of reactive elements are attached to the transmit coil at least a quarter of a turn from the input terminal. Furthermore, the wireless charger can include a controller to modify a reactance value of the reactive elements to adjust a current distribution of the transmit coil in response to detecting a characteristic of a power receiving unit with a metal backing, the characteristic comprising a size of the power receiving unit, or a coupling distance between the power transmitting unit and the power receiving unit.

Alternatively, or in addition, the input terminal can attach to the center of the transmit coil. Alternatively, or in addition, the input terminal of the transmit coil can be located at an outer edge of the transmit coil. Alternatively, or in addition, the reactive elements of the transmit coil can be located in the center of the transmit coil. Alternatively, or in addition, the reactive elements can be attached to the transmit coil at an edge of the transmit coil. Alternatively, or in addition, the reactive elements can include fixed capacitors, inductors, tunable inductors, or tunable capacitors. Alternatively, or in addition, the reactive elements can be connected to the transmit coil at a plurality of symmetric locations. Alternatively, or in addition, adjusting the current distribution of the transmit coil can cause the transmit coil to have the magnitude of a reactance value below a threshold proximate the input terminal. Alternatively, or in addition, the characteristic of the power receiving unit can include a metal backing. Alternatively, or in addition, the characteristic of the power receiving unit can include a size of the power receiving unit, or a coupling distance between the power transmitting unit and the power receiving unit.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A power transmitting unit, comprising:
a transmit coil configured to generate a magnetic field to wirelessly power a device within an active wireless charging area;
a power source to transmit an alternating electrical current (A/C) to an input terminal of the transmit coil;
a plurality of reactive elements placed in series with the transmit coil, wherein the plurality of reactive elements attach to the transmit coil at least a quarter of a turn from the input terminal; and
a controller to modify a reactance value of the reactive elements to adjust a current distribution of the transmit coil in response to detecting a characteristic of a power receiving unit, wherein the characteristic of the power receiving unit comprises a metal backing and modifying the reactance value comprises opening or closing a number of the reactive elements proximate a center of the transmit coil to adjust the current distribution, the controller to further establish a wireless communication with the power receiving unit, the wireless communication comprising data indicating a size of the device to be wirelessly powered and a wireless charging capability of the device.

2. The power transmitting unit of claim 1, wherein the input terminal attaches to the center of the transmit coil.

3. The power transmitting unit of claim 2, wherein the plurality of reactive elements attach to the transmit coil at an edge of the transmit coil.

4. The power transmitting unit of claim 1, wherein the input terminal of the transmit coil attaches to an outer edge of the transmit coil.

5. The power transmitting unit of claim 4, wherein the plurality of reactive elements of the transmit coil attach to the center of the transmit coil.

6. The power transmitting unit of claim 1, wherein the plurality of reactive elements comprise a plurality of fixed capacitors, inductors, tunable inductors, or tunable capacitors.

7. The power transmitting unit of claim 1, wherein the plurality of reactive elements connect to the transmit coil at a plurality of symmetric locations.

8. The power transmitting unit of claim 1, wherein the characteristic of the power receiving unit comprises a size of the power receiving unit, or a coupling distance between the power transmitting unit and the power receiving unit.

9. A method of manufacturing a power transmitting unit, comprising:
forming a transmit coil configured to generate a magnetic field to wirelessly power a device within an active wireless charging area;
conductively coupling a power source to transmit an alternating electrical current to an input terminal of the transmit coil;
conductively coupling a plurality of reactive elements placed in series with the transmit coil, wherein the plurality of reactive elements attach to the transmit coil at least a quarter of a turn from the input terminal; and
conductively coupling a controller to the transmit coil to modify a reactance value of the reactive elements to adjust a current distribution of the transmit coil in response to detecting a characteristic of a power receiving unit, wherein the characteristic of the power receiving unit comprises a metal backing and modifying the reactance value comprises opening or closing a number of the reactive elements proximate a center of the transmit coil to adjust the current distribution, the controller to further establish a wireless communication with the power receiving unit, the wireless communication comprising data indicating a size of the device to be wirelessly powered and a wireless charging capability of the device.

10. The method of claim 9, wherein the input terminal attaches to the center of the transmit coil.

11. The method of claim 10, wherein the plurality of reactive elements of the transmit coil attach to an edge of the transmit coil.

12. The method of claim 9, wherein the input terminal of the transmit coil attaches to an outer edge of the transmit coil.

13. The method of claim 12, wherein the plurality of reactive elements of the transmit coil attach to the center of the transmit coil.

14. The method of claim 9, wherein the plurality of reactive elements comprise fixed capacitors, inductors, tunable inductors, or tunable capacitors.

15. The method of claim 9, wherein the plurality of reactive elements connect to the transmit coil at a plurality of symmetric locations.

16. The method of claim 9, wherein the characteristic of the power receiving unit comprises a size of the power receiving unit, or a coupling distance between the power transmitting unit and the power receiving unit.

17. A wireless charger, comprising:
a transmit coil configured to generate a magnetic field to wirelessly power a device within an active wireless charging area;
a power source to transmit an alternating electrical current to an input terminal of the transmit coil;
a plurality of reactive elements placed in series with the transmit coil, wherein the plurality of reactive elements attach to the transmit coil at least a quarter of a turn from the input terminal; and
a controller to modify a reactance value of the plurality of reactive elements to adjust a current distribution of the transmit coil in response to detecting a characteristic of a power receiving unit with a metal backing, the characteristic comprising a size of the power receiving unit, or a coupling distance between the power transmitting unit and the power receiving unit, wherein modifying the reactance value comprises opening or closing a number of the reactive elements proximate a center of the transmit coil to adjust the current distribution, the controller to further establish a wireless communication with the power receiving unit, the wireless communication comprising data indicating a size of the device to be wirelessly powered and a wireless charging capability of the device.

18. The wireless charger of claim 17, wherein the input terminal attaches to the center of the transmit coil.

19. The wireless charger of claim 18, wherein the plurality of reactive elements attach to an edge of the transmit coil.

20. The wireless charger of claim 17, wherein the input terminal of the transmit coil attaches to an outer edge of the transmit coil.

21. The wireless charger of claim 20, wherein the plurality of reactive elements attach to the center of the transmit coil.

* * * * *